United States Patent
Karassev et al.

[11] Patent Number: 6,124,970
[45] Date of Patent: *Sep. 26, 2000

[54] POLYMER MATERIALS WITH LATENT IMAGES VISIBLE IN POLARIZED LIGHT AND METHODS FOR THEIR PRODUCTION

[75] Inventors: Andrei Karassev; Anatoli Vannikov; Vladimir Kazarinov; Ludmila Karasseva, all of Moscow, Russian Federation

[73] Assignee: Latents Image Technology Ltd., Jerusalem, Israel

[*] Notice: This patent issued on a continued prosecution application filed under 37 CFR 1.53(d), and is subject to the twenty year patent term provisions of 35 U.S.C. 154(a)(2).

[21] Appl. No.: 08/953,992

[22] Filed: Oct. 20, 1997

[51] Int. Cl.[7] ............................. G02B 27/28; B42D 15/00
[52] U.S. Cl. ............................................. 359/485; 283/90
[58] Field of Search ................................... 359/485, 500, 359/501; 283/87, 89, 90, 91

[56] References Cited

U.S. PATENT DOCUMENTS

| | | |
|---|---|---|
| 3,313,052 | 4/1967 | Malster . |
| 3,313,941 | 4/1967 | Marks . |
| 3,391,479 | 7/1968 | Buzzell et al. . |
| 3,610,120 | 10/1971 | Morse et al. . |
| 3,683,764 | 8/1972 | Johnson . |
| 3,827,726 | 8/1974 | McVoy et al. . |
| 4,175,775 | 11/1979 | Kruegle . |
| 4,659,112 | 4/1987 | Reiner et al. . |
| 4,974,941 | 12/1990 | Gibbons et al. . |
| 5,004,327 | 4/1991 | Rosen . |
| 5,033,829 | 7/1991 | Faroughy . |
| 5,059,776 | 10/1991 | Antes . |
| 5,262,882 | 11/1993 | Hikmet . |
| 5,284,364 | 2/1994 | Jain .................................... 283/87 |
| 5,389,698 | 2/1995 | Chigrinov et al. . |
| 5,427,828 | 6/1995 | Park . |
| 5,434,687 | 7/1995 | Kawata et al. . |
| 5,602,661 | 2/1997 | Schadt et al. . |

FOREIGN PATENT DOCUMENTS

| | | |
|---|---|---|
| 0 331 233 A3 | 2/1989 | European Pat. Off. . |
| 0 387 059 A2 | 3/1990 | European Pat. Off. . |
| 0 423 881 A1 | 10/1990 | European Pat. Off. . |
| 0 525 477 A1 | 7/1992 | European Pat. Off. . |
| 0 525 478 A2 | 7/1992 | European Pat. Off. . |
| 0 611 786 A1 | 8/1994 | European Pat. Off. . |
| 0 689 065 A1 | 6/1995 | European Pat. Off. . |
| 0 689 084 A1 | 6/1995 | European Pat. Off. . |
| 0 675 186 A1 | 10/1995 | European Pat. Off. . |

OTHER PUBLICATIONS

Vannikov et al, "New Photochromic Materials for Visible Range", *SPIE*, 2722: 252–254, 1996.

Leage et al, "Photoinduced Phase Transitions in Novel Liquid–crystalline Copolymers", *J. Mater. Chem.*, 1(2): 303–304, 1991.

*Primary Examiner*—Cassandra Spyrou
*Assistant Examiner*—Jared Treas
*Attorney, Agent, or Firm*—Mark M. Friedman

[57] ABSTRACT

An authenticatable product includes a non-opaque latent image layer of polymer material treated so as to contain at least one region having anisotropic optical properties such that, when viewed directly, the at least one region is indistinguishable from the remainder of the latent image layer and, under polarized visualization, the at least one region is distinguished readily from the remainder of the latent image layer. The latent image layer may be supplemented with visible information, a reflective layer, a quarterwave plate, a polarizer, or may be part of a more complex multi-layer structure. The product may be used in a wide range of authentification applications. Also described is a method for producing such a latent image including steps of photoactivation, selective exposure and processing/fixing of the image.

36 Claims, 2 Drawing Sheets

POLYMER MATERIALS WITH LATENT IMAGES VISIBLE IN POLARIZED LIGHT AND METHODS FOR THEIR PRODUCTION

FIELD AND BACKGROUND OF THE INVENTION

The present invention relates to security and authentication and, in particular, it concerns polymer layers having latent images visible in polarized light and methods for generating such layers.

It is known to produce various copy-resistant features in manufactured products to guard against forgery. Typical examples of such features are water-marks, holograms, micro-printing and embedded metallic strips.

An alternative type of protection could be provided by features which, although not immediately visible, may readily be checked to confirm the authenticity of a product. One attempt at such a feature employs implanted liquid crystal optical elements which are configured to affect the polarization of transmitted light such that, when viewed through a polarizer, an identifiable pattern is seen.

Examples of such a structure are described in European Patent Publications EP 689 065 A1 and EP 689 084 A1. The structures disclosed are multi-layer structures forming optical components based on a photo-crosslinked liquid crystal "monomer". Formation of the optical components in the liquid crystal polymers requires multiple coating of the substrate material with subsequent photochemical, electrical, magnetic and mechanical processing.

The structures described in the aforementioned documents suffer from considerable practical limitations. Firstly, formation of multi-layer liquid crystal components with separate processing of each layer requires complex and expensive manufacturing equipment and materials. Secondly, the various layers making up the liquid crystal components differ in their optical, chemical and mechanical properties. These differences may lead to de-lamination and/or image quality deterioration when the structure is exposed to thermal, chemical or mechanical stresses. Furthermore, the complexity of the multi-layer structure rules out its use in certain applications such as, for example, flexible film. It is also important to note that liquid crystal images are normally visible when viewed directly by the human eye.

The theoretical background of the formation of stable latent images (SLI) in polymers was described in SPIE Volume 2722 (page 252, Smart Structures and Materials, 1996): "New photochromic materials for visible range" by A. Vannikov and A. Karassev, which is hereby incorporated by reference in its entirety as if set out herein. This paper describes the scientific principles of SLI formation in polymers, but deliberately withheld and misrepresented certain information to ensure that no enabling disclosure was given. Specifically, the paper omits accurate details of three crucial processing parameters:

1. The chemical composition that creates photosensitivity in the polymer matrix. The correct concentration of the elements forming the composition is critical. Wrong concentration causes formation of visible image or no image at all instead of SLI.
2. The chemical composition of the developer/fixer. Here again, SLI is extremely sensitive to the chemistry of the composition.
3. The order of the development/fixation process There is therefore a need for latent image products in which a latent image, visible in polarized light, is provided within a single polymer layer, which are convenient and economical to produce, and which are structurally simple and mechanically stable such that they can be used in a wide range of practical applications. It would also be advantageous to provide straightforward and economical methods for producing such products.

SUMMARY OF THE INVENTION

The present invention is an authenticatable product including a layer of polymer material which has a latent image invisible when viewed in unpolarized light which becomes visible with the aid of polarizers. The invention also relates to methods for producing such polymer layers.

According to the teachings of the present invention there is provided, an authenticatable product comprising a non-opaque latent image layer of polymer material treated so as to contain at least one region having anisotropic optical properties such that, when viewed directly, the at least one region is indistinguishable from the remainder of the latent image layer and, under polarized visualization, the at least one region is distinguished readily from the remainder of the latent image layer.

According to a further feature of the present invention, the mechanical properties of the at least one region are substantially identical to those of the remainder of the latent image layer.

According to a further feature of the present invention, the product further comprises information visible when viewed directly, the information being associated with the latent image layer.

According to a further feature of the present invention, the product further comprises a reflective layer attached to a surface of the latent image layer.

According to a further feature of the present invention, the product further comprises a quarterwave plate attached to a surface of the latent image layer.

According to a further feature of the present invention, the product further comprises a polarizer attached to a surface of the latent image layer.

According to a further feature of the present invention, there is also provided a layer of light-scattering material attached to the polarizer on a side distant from the latent image layer.

According to a further feature of the present invention, there is also provided a second latent image layer similar to the first latent image layer but having a different distribution of the at least one region, the second latent image layer being rotated relative to the first latent image layer.

According to an alternative feature of the present invention, there is also provided a second latent image layer similar to the first latent image layer but having a different distribution of the at least one region, the first and second latent image layers being attached to opposite sides of a linear polarizer.

According to a further feature of the present invention, the latent image layer is designed such that optical properties of the latent image layer are substantially unchanged by exposure to temperatures of up to about 150°.

According to a further feature of the present invention, the latent image layer is treated so as to render the latent image layer brittle.

According to a further feature of the present invention, the latent image layer is substantially transparent.

According to a further feature of the present invention, the latent image layer is highly transparent.

According to a further feature of the present invention, the latent image layer is implemented as at least part of a packaging material.

According to a further feature of the present invention, the latent image layer is implemented as part of an adhesive label.

According to a further feature of the present invention, the latent image layer is implemented as part of a consumer card.

According to a further feature of the present invention, the latent image layer is implemented as part of an identity card.

According to a further feature of the present invention, there is also provided a light-transmitting window formed through the product, the latent image layer being associated with the window so as to be viewable under polarized visualization employing light transmitted through the window.

According to a further feature of the present invention, there is also provided a light-reflecting region formed in the product, the latent image layer being associated with the window so as to be viewable under polarized visualization employing light reflected from the light-reflecting region.

There is also provided according to a further feature of the present invention, a method for producing a latent image which is invisible when viewed directly but can be seen under polarized visualization, the method comprising the steps of: (a) treating an initially photostable polymer with a solution containing a photoactivator agent so as to render at least part of the polymer sensitive to radiation; (b) selectively exposing the polymer to radiation so as to form a latent image therein; and (c) processing the polymer so as to fix the latent image.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an authenticatable product including a layer of polymer material which has a latent image invisible when viewed in unpolarized light which becomes visible with the aid of polarizers. The invention also relates to methods for producing such polymer layers.

The latent image polymer layers of the present invention are of great importance for verifying genuineness of articles of various types and for authenticating documents, financial securities, consumer goods, etc. to prevent forgery, mimicking and unauthorized alteration.

Locally modified structures in polymer films form Stable Latent Images (SLI) invisible in natural light and visible in polarized light. SLI cannot be copied by standard copying equipment.

The principles and operation of latent image polymer layers and methods for their production according to the present invention may be better understood with reference to the drawings and the accompanying description.

Figure 1:
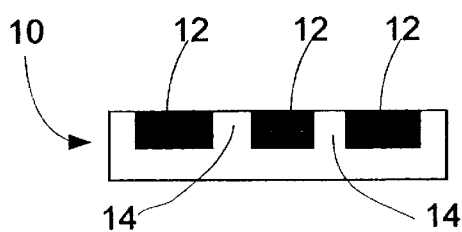
FIG. 1 is a schematic cross-sectional view through a polymer layer, constructed and operative according to the teachings of the present invention, featuring a latent image visible in polarized light.

Referring now to the drawings, FIG. 1 illustrates a latent image polymer layer, generally designated 10, constructed and operative according to the teachings of the present invention. Layer 10 may be used alone, thereby corresponding to the most basic example of an authenticatable product according to the present invention, or may form a part of a greater product as will be discussed with reference to FIGS. 2–7, below.

Generally speaking, polymer layer 10 is treated so as to contain a number of regions 12 having optical properties differing from those of other areas 14 such that, when viewed directly, regions 12 are indistinguishable from the other areas 14 of layer 10 and, under polarized visualization, regions 12 are distinguished readily from areas 14 of layer 10. Regions 12, either individually or considered together, preferably form an identifiable pattern or image, referred to as a "latent image".

Unlike the liquid-crystal-based technology of the aforementioned prior art, it is a particular feature of the present invention that the latent image is formed within a single, otherwise substantially uniform, layer of polymer material. Although the layer may be used together with additional layers to provide desired structural properties or functionality as will be described below, the latent image layer itself can be produced and used to provide its light modulating effect without any additional layers.

The optical effect of layer 10 is typically one of selective rotation of the polarization of transmitted light within either or both of regions 12 and areas 14. The extent of the rotation is dependent upon the structure of the polymer matrix and the depth to which regions 12 are produced. Structurally, image regions 12 differ from background areas 14 in the preferred direction of anisotropy and/or in the proportions of amorphousness and crystallinity of the polymer. Thus, the image regions 12 may be relatively either more or less oriented than the background regions 14, and the preferred directions of anisotropy may differ.

The various techniques which may be employed to view the latent images of the present invention are referred to collectively herein in the description and claims as "polarized visualization". Polarized visualization generally requires viewing layer 10 as an intermediate optical element between two polarizing elements. In the simplest implementation of layer 10 as a transparent film, polarized visualization is most effectively achieved by viewing the film between crossed polarizers. As the film is rotated, an angle of maximum contrast will be reached when either regions 12 or areas 14 are at their brightest and the rest of layer 10 remains dark. Visualization may also be possible between parallel or otherwise oriented polarizers, but the contrast obtained is typically lower than that achieved between crossed polarizers. Other forms of polarized visualization in which one polarizer is attached to layer 10, or in which light passes twice through the same polarizer by reflection, will be described below in the context of FIGS. 3, 6 and 7.

It will be noted that the latent images of the present invention correspond to variations in crystallinity and/or directions of anisotropy in a layer which is otherwise highly uniform. As a result, and in contrast to liquid crystal based structures, regions 12 and areas 14 are typically indistinguishable when viewed under unpolarized or polarized illumination, and even when viewed obliquely.

The single layer structure of the latent image layers of the present invention provide profound advantages for practical implementations. Firstly, the mechanical properties of regions 12 are identical, or very similar, to those of remainder 14 of latent image layer 10. As a result, problems of de-lamination or image quality deterioration under mechanical stress are effectively eliminated. In addition, the materials used are preferably chosen such that the optical properties of latent image layer 10 are substantially unchanged by exposure to elevated temperatures, typically in a range of up to about 150°.

Turning now to the production of a layer 10 according to the present invention, this can typically be subdivided into three stages: firstly, an initially photostable polymer is impregnated with an aqueous or alcohol solution of a photoactivator agent so as to render the polymer sensitive to radiation; then, the polymer is selectively exposed to radiation so as to form a latent image therein; and finally, the polymer is processed so as to develop and fix the latent image. The result of this process is a locally modified structure of the polymer matrix.

The present invention can be implemented in a number of different types of polymer film including, but not limited to, polyethylene, polypropylene, E.V.A. and fluoropolymers such as "Teflon". Clearly, in order to produce a viewable image, the polymer films used must be "non-opaque", defined herein to imply a transparency of at least about 20%. In order to obtain a high quality image, the layer must be "substantially transparent", defined herein to imply at least about 50% transmission. In the case of an optically dense materials such as Teflon, acceptable levels of transparency may be achieved by forming a micro-layer on the surface of a transparent substrate. In certain preferred implementations of the present invention, high transparencies of layer 10 in excess of about 90% are obtained.

A preferred example to be described here in detail relates to the use of Hydrate Cellulose film or "Cellophane". Photosensitivity in Hydrate Cellulose film is created by impregnating it in 2% solution of Copper (II) Chloride ($CuCl_2$) in 1% Hydrochloric Acid (HCl) for 12 hours. After drying of the film at room temperature (until the surface is dry) it is ready for irradiation. The photosensitive film is exposed to the UV light (Low Pressure Mercury Lamp) through a mask for about 10 to 30 minutes depending on intensity of the lamp and the distance of the film from the light source. The UV light used need not be polarized. This exposure causes local modification of the polymer structure with a change in the degree of crystallization and a different preferred direction of anisotropy from the unexposed background areas.

The exposed film is developed and fixed in 1% water solution of Potassium Thiocyanate (KCNS) for 10 minutes. The developed film is rinsed in water and dried preferably at room temperature until the surface is dry.

The processed Hydrate Cellulose film now contains SLI and is thermally stable up to 150 degrees C. The transparency of the film remains that of the untreated film, namely, with absorption of only a few percent at each interface.

It will be appreciated that, by use of an appropriate mask, any desired SLI may be formed. Examples include, but are not limited to, words, alphanumeric characters or symbols, geometrical patterns, trademarks and other company emblems. By using a gray-scale or continuous-tone mask, gray-scale or continuous-tone images can be produced, thereby allowing SLI reproduction of photographic images or the like. Photographic-quality images can be achieved by fine rastering of the image. Experiments to-date have achieved $10\mu$ resolution and there appears to be no theoretical limitation to achieving sub-micron resolutions. The contrast ratio of the image is a function of respective angles between the polarizers and the axis of anisotropy of the film.

In an optional additional production step, the exposed film (for $CuCl_2$ treated films only) may be heated to 75 degrees C. before the development and fixation. The other process steps remain unchanged. This heat treatment renders the film extremely fragile or brittle. This effect has a significant advantage for producing authentication wrapping or labels that cannot be removed from the protected object without destroying the SLI.

Figure 6:
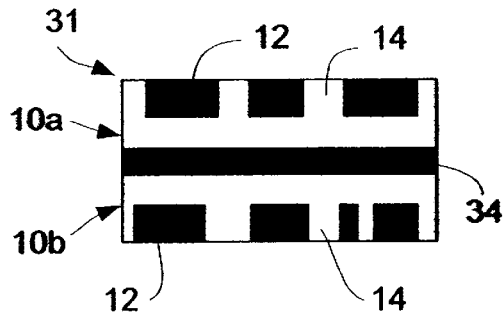
FIG. 6 is a schematic cross-sectional view through an additional example of a product, constructed and operative according to the teachings of the present invention, employing two polymer layers as in FIG. 1 with a polarizer sandwiched between them.
Figure 7:
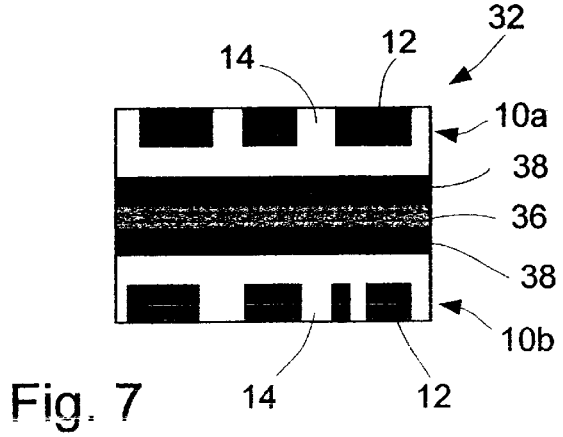
FIG. 7 is a schematic cross-sectional view through yet another example of a product, constructed and operative according to the teachings of the present invention, also employing two polymer layers as in FIG. 1 with a light scattering layer sandwiched between them.
Figure 8:
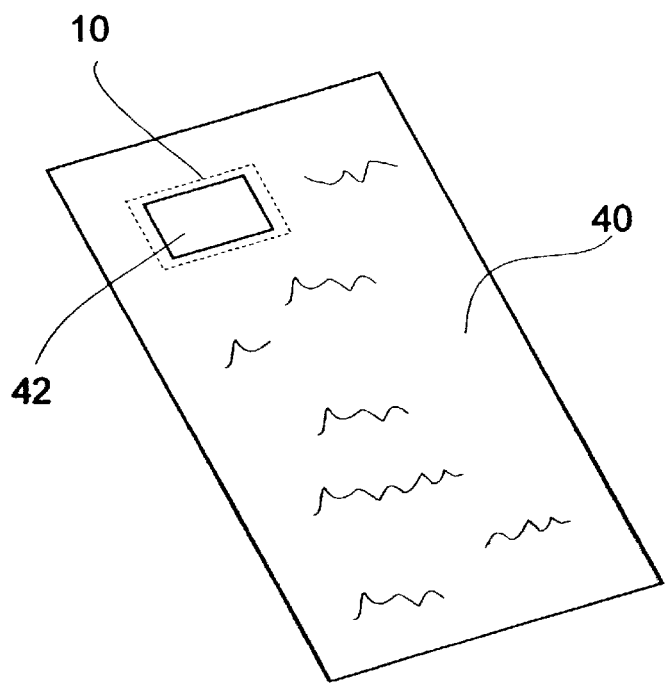
FIG. 8 is a schematic perspective view of an authenticatable product, constructed and operative according to the teachings of the present invention, formed with a polymer layer overlapping a light transmitting window.

Turning now to a number of possible applications of the present invention, these will be illustrated with reference to FIGS. 1–7. As mentioned earlier, the transparent layer or film of FIG. 1, in itself, constitutes a useful product. Such a film may be used directly, with or without the aforementioned heat treatment, as a packaging material over part or all of documents or consumer goods. Additionally, as illustrated in FIG. 8, it can be employed as part of an authenticatable product, represented here as document 40, by placing the film 10 over an open or transparent window 42 formed through the product. The image can then be viewed under polarized visualization employing light transmitted through the window.

Figure 2:
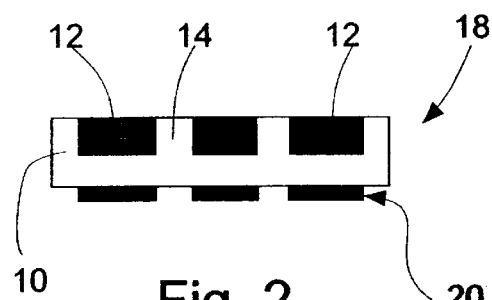
FIG. 2 is a schematic cross-sectional view through an example of a product, constructed and operative according to the teachings of the present invention, employing the polymer layer of FIG. 1 with additional visible markings.

FIG. 2 shows a product, generally designated 18, constructed and operative according to the teachings of the present invention, in which layer 10 is supplemented with additional visible information 20. Because of the high optical transparency of layer 10, information 20 can be located on the rear face of layer 10. This allows display of product information or advertising material on product 18 used as packaging and/or use of additional security features.

Figure 3:
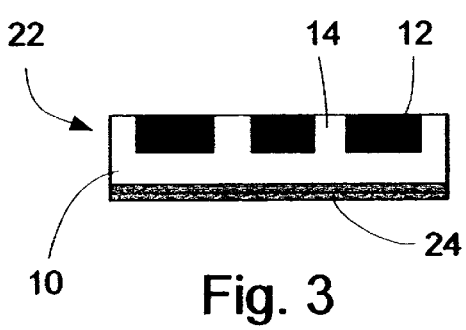
FIG. 3 is a schematic cross-sectional view through a further example of a product, constructed and operative according to the teachings of the present invention, employing the polymer layer of FIG. 1 together with a reflective layer.
Figure 9:
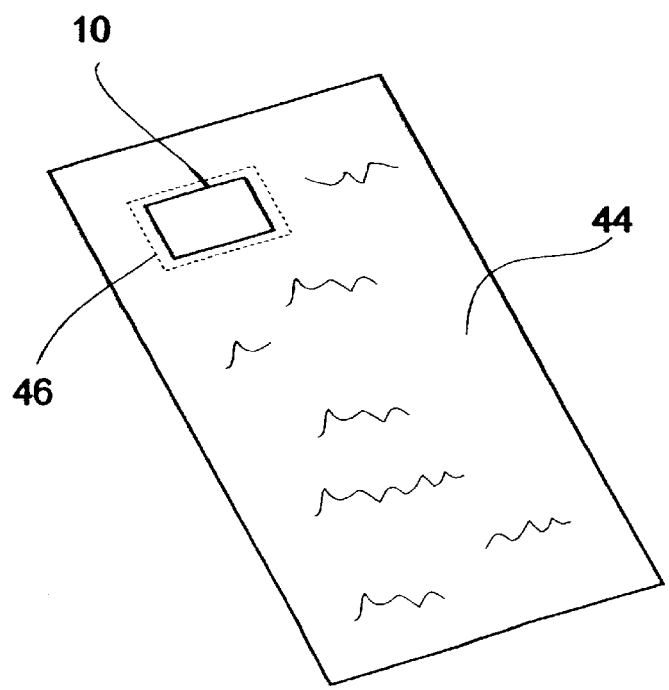
FIG. 9 is a schematic perspective view of an authenticatable product, constructed and operative according to the teachings of the present invention, formed with a polymer layer overlapping a light-reflecting region.

FIG. 3 shows a product, generally designated 22, constructed and operative according to the teachings of the present invention, in which a reflective layer 24 is attached to the rear surface of layer 10. Polarized visualization of the SLI can be achieved by use of a single linear polarizer, or in this case a circular polarizer, held in front of the product. As a result, this structure is suitable for application onto, or inclusion within, non-transparent objects. Thus, by way of non-limiting examples, product 22 may correspond to an adhesive label, an identity card or a consumer card such as a credit card, bank or store card. Additionally, as illustrated in FIG. 9, the equivalent of this structure can be formed as part of an authenticatable product, represented here by document 44, by placing the transparent layer 10 over a light-reflecting region 46 formed in the product. The image can then be viewed under polarized visualization employing light reflected from the light-reflecting region.

Figure 4:
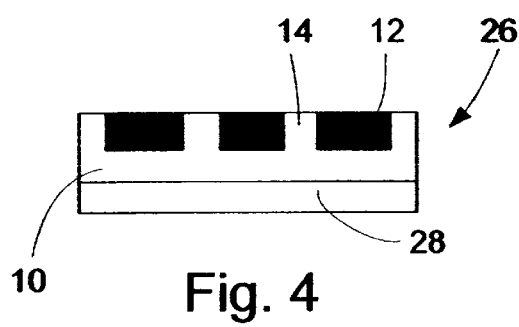
FIG. 4 is a schematic cross-sectional view through a still further example of a product, constructed and operative according to the teachings of the present invention, employing the polymer layer of FIG. 1 in combination with a quarter-wave plate.

Turning now to FIG. 4, this shows a product, generally designated 26, constructed and operative according to the teachings of the present invention, in which a quarter-wave plate 28 is attached to the rear surface of layer 10. This serves to modify the wave structure of certain wavelengths of the incident light. When polarized visualization is then performed with product 26 positioned between crossed-polarizers, modified color and positive/negative transitions are observed.

Figure 5:
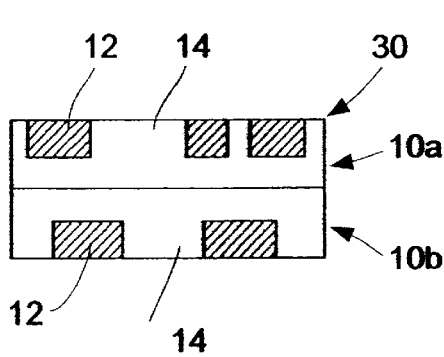
FIG. 5 is a schematic cross-sectional view through another example of a product, constructed and operative according to the teachings of the present invention, employing two superimposed polymer layers as in FIG. 1.

A range of useful effects can be achieved by employing a plurality of layers 10 together. FIGS. 5, 6 and 7 show three products designated 30, 31 and 32, respectively, constructed and operative according to the teachings of the present invention, which each employ two latent image layers 10a and 10b.

In product 30, layers 10a and 10b, each having a different SLI with anisotropy axes oriented typically at about 45 degrees to each other, are directly superimposed. The two images can be viewed alternately by rotating the element between two polarizers. The same element positioned on top of a reflective substrate allows viewing by use of a single polarizer. In the latter case, the images can be switched by rotation of the polarizer.

In product 31, the two layers, each containing a different SLI, are located on opposite sides of a linear polarizer 34 which is sandwiched between them. Here, the SLI is viewed by placing a single polarizer in front of, or behind, the product surfaces. The image viewed at any time will be the SLI which is between the polarizers.

Elements employing a light scattering layer (for example, paper), polarizer and a transparent layer with SLI on top them can be used as an analogy to water marks commonly used in banknotes and securities. Again, the SLI is viewed by placing a polarizer on top of the element.

Product 32 is similar to product 31, but replaces polarizer 34 with a light-scattering substrate 36 sandwiched between two polarizers 38. This structure serves as a double version of the aforementioned water-mark type application in which the SLI of each layer can be viewed by holding a polarizer in front of the product.

It will be appreciated that the above descriptions are intended only to serve as examples, and that many other embodiments are possible within the spirit and the scope of the present invention.

What is claimed is:

1. An authenticatable product comprising a non-opaque latent image layer of anisotropic polymer material having background optical properties with a given preferred direction of anisotropy and a given proportion of crystallinity, said latent image layer being treated so as to contain at least one region having anisotropic optical properties differing from said background optical properties in at least one of said given preferred direction of anisotropy and said given proportion of crystallinity such that, when viewed directly, said at least one region is indistinguishable from the remainder of said latent image layer and, under polarized visualization, said at least one region is distinguished readily from the remainder of said latent image layer.

2. The product of claim 1, wherein said at least one region has mechanical properties substantially identical to mechanical properties of the remainder of said latent image layer.

3. The product of claim 1, wherein the product further comprises information visible when viewed directly, said information being associated with said latent image layer.

4. The product of claim 1, wherein the product further comprises a reflective layer attached to a surface of said latent image layer.

5. An authentication system comprising the product of claim 4 and a linear polarizer as a visualization device.

6. An authentication system comprising the product of claim 4 and a circular polarizer as a visualization device.

7. The product of claim 1, wherein the product further comprises a quarterwave plate attached to a surface of said latent image layer.

8. The product of claim 7, wherein sad invisible image displays positive/negative transitions as viewed with rotation under polarized visualization employing at least one linear polarizer.

9. The product of claim 7, wherein said invisible image displays color variations as viewed with rotation under polarized visualization employing at least one linear polarizer.

10. The product of claim 1, wherein the product further comprises a polarizer attached to a surface of said latent image layer.

11. The product of claim 10, further comprising a layer of light-scattering material attached to said polarizer on a side distant from said latent image layer.

12. An authentication system comprising the product of claim 11 and a linear polarizer as a visualization device.

13. An authentication system comprising the product of claim 11 and a circular polarizer as a visualization device.

14. The product of claim 1, said latent image layer being referred to as said first latent image layer, further comprising a second latent image layer similar to said first latent image layer but having a different distribution of said at least one region, wherein said second latent image layer is rotated relative to said first latent image layer.

15. The product of claim 1, said latent image layer being referred to as said first latent image layer, further comprising a second latent image layer similar to said first latent image layer but having a different distribution of said at least one region, wherein said first and second latent image layers are attached to opposite sides of a linear polarizer.

16. The product of claim 1, wherein said latent image layer is designed such that optical properties of said latent image layer are substantially unchanged by exposure to temperatures of up to 150° C.

17. The product of claim 1, wherein said latent image layer is treated so as to render said latent image layer brittle.

18. The product of claim 1, wherein said latent image layer is substantially transparent.

19. The product of claim 1, wherein said latent image layer is highly transparent.

20. The product of claim 1, wherein said latent image layer is implemented as at least part of a packaging material.

21. The product of claim 1, wherein said latent image layer is implemented as part of an adhesive label.

22. The product of claim 1, wherein said latent image layer is implemented as part of a consumer card.

23. The product of claim 1, wherein said latent image layer is implemented as part of an identity card.

24. The product of claim 1, further comprising a light-transmitting window formed through the product, and wherein said latent image layer is associated with said window so as to be viewable under polarized visualization employing light transmitted through said window.

25. The product of claim 1, further comprising a light-reflecting region formed in the product, and wherein said latent image layer is associated with said window so as to be viewable under polarized visualization employing light reflected from said light-reflecting region.

26. The product of claim 1, wherein said invisible image includes more than two different levels of optical density as viewed under polarized visualization.

27. The product of claim 1, wherein said invisible image includes substantially continuous-tone variations in optical density as viewed under polarized visualization.

28. The product of claim 1, wherein said invisible image is visible when viewed through a circular polarizer.

29. An authentication system comprising the product of claim 1 and two polarizers as a visualization device.

30. A method for producing a latent image which is invisible when viewed directly but can be seen under polarized visualization, the method comprising the steps of:
  (a) treating an initially photostable anisotropic polymer, having background optical properties with a given preferred direction of anisotropy and a given proportion of crystallinity, with a solution containing a photoactivator agent so as to render at least part of said polymer sensitive to radiation;
  (b) selectively exposing said polymer to radiation so as to form a latent image therein; and
  (c) processing said polymer so as to fix said latent image, said treating, exposing and processing being performed such that said latent image has anisotropic optical properties differing from said background optical properties in at least one of said given preferred direction of anisotropy and said given proportion of crystallinity.

31. The method of claim 30, wherein said selectively exposing is performed through a gray-tone mask.

32. The method of claim 30, wherein said selectively exposing is performed through a continuous-tone mask.

33. The method of claim 30, wherein said selectively exposing is performed using unpolarized radiation.

34. The method of claim 30, wherein said latent image is formed so as to be visible when viewed through a circular polarizer.

35. An authenticatable product comprising a non-opaque latent image layer of polymer material treated so as to contain an image formed by at least one region having anisotropic optical properties such that, when viewed directly, said at least one region is indistinguishable from the remainder of said latent image layer and, under polarized visualization, said at least one region is distinguished readily from the remainder of said latent image layer so that said image is readily visible, said image including substantially continuous-tone variations in optical density.

36. A method for producing a latent image which is not readily visible when viewed directly but can be seen readily under polarized visualization, the method comprising the steps of:
  (a) treating an initially photostable polymer with a solution containing a photoactivator agent so as to render at least part of said polymer sensitive to radiation;
  (b) selectively exposing said polymer to radiation so as to form a latent image therein; and
  (d) processing said polymer so as to fix said latent image, said treating, exposing and processing being performed such that said latent image is not readily visible when viewed directly but exhibits substantially continuous variations in optical density as viewed under polarized visualization.

* * * * *